April 22, 1958 G. K. C. HARDESTY 2,832,039
INTEGRAL CONDUCTIVITY CELL AND VALVE
Filed Aug. 7, 1956 4 Sheets-Sheet 1
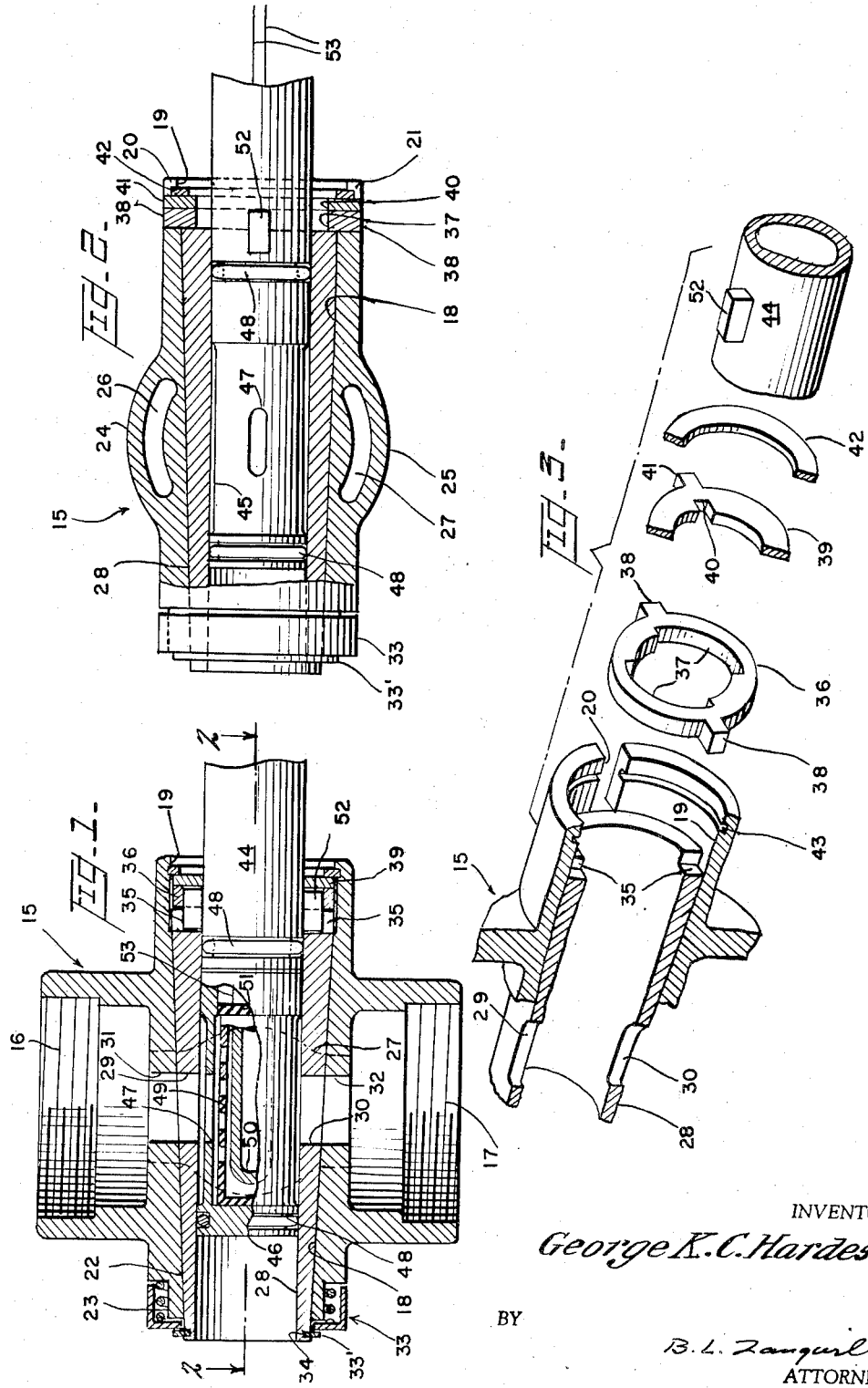
INVENTOR
George K. C. Hardesty,
BY
B. L. Zangwill
ATTORNEYS

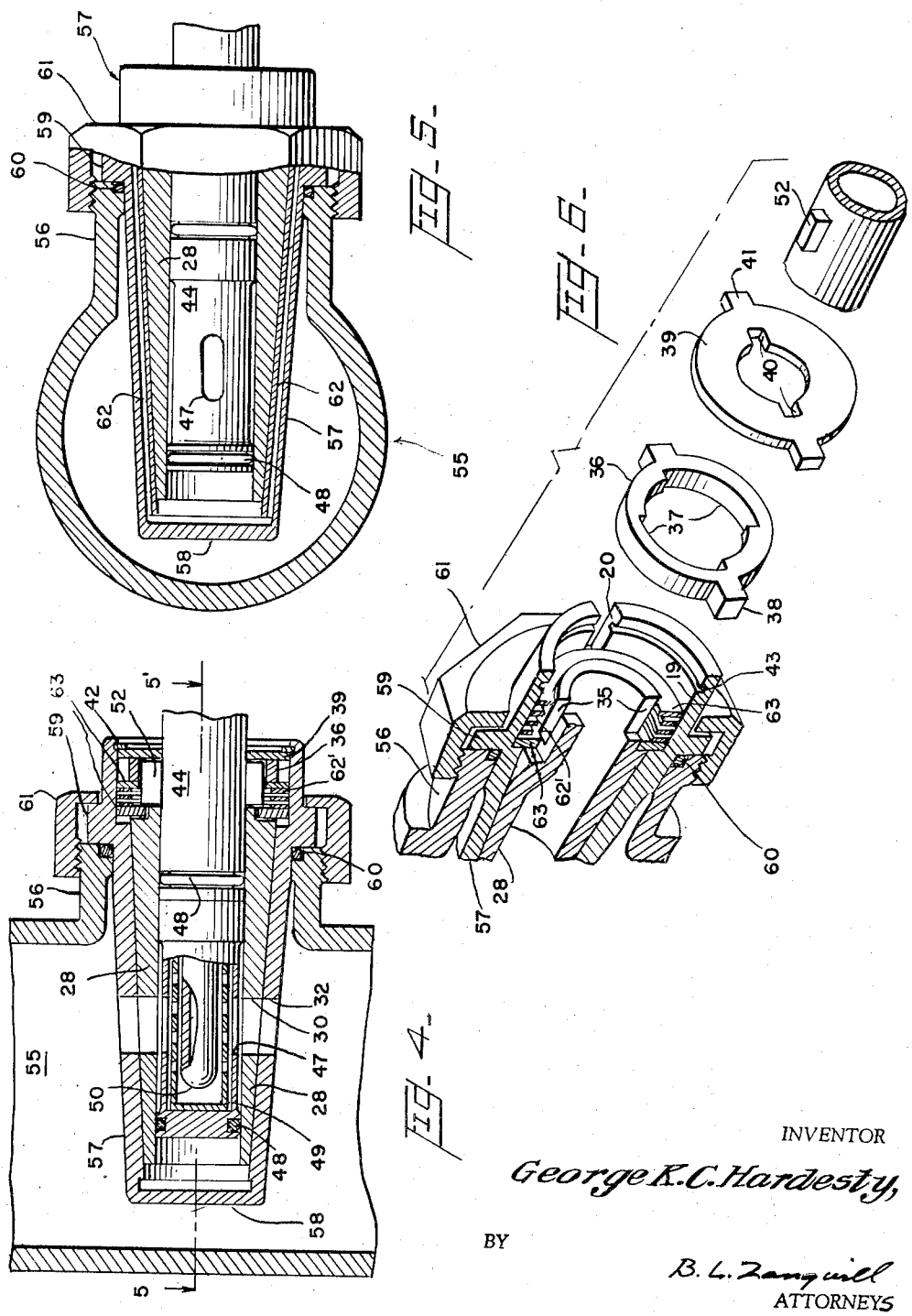

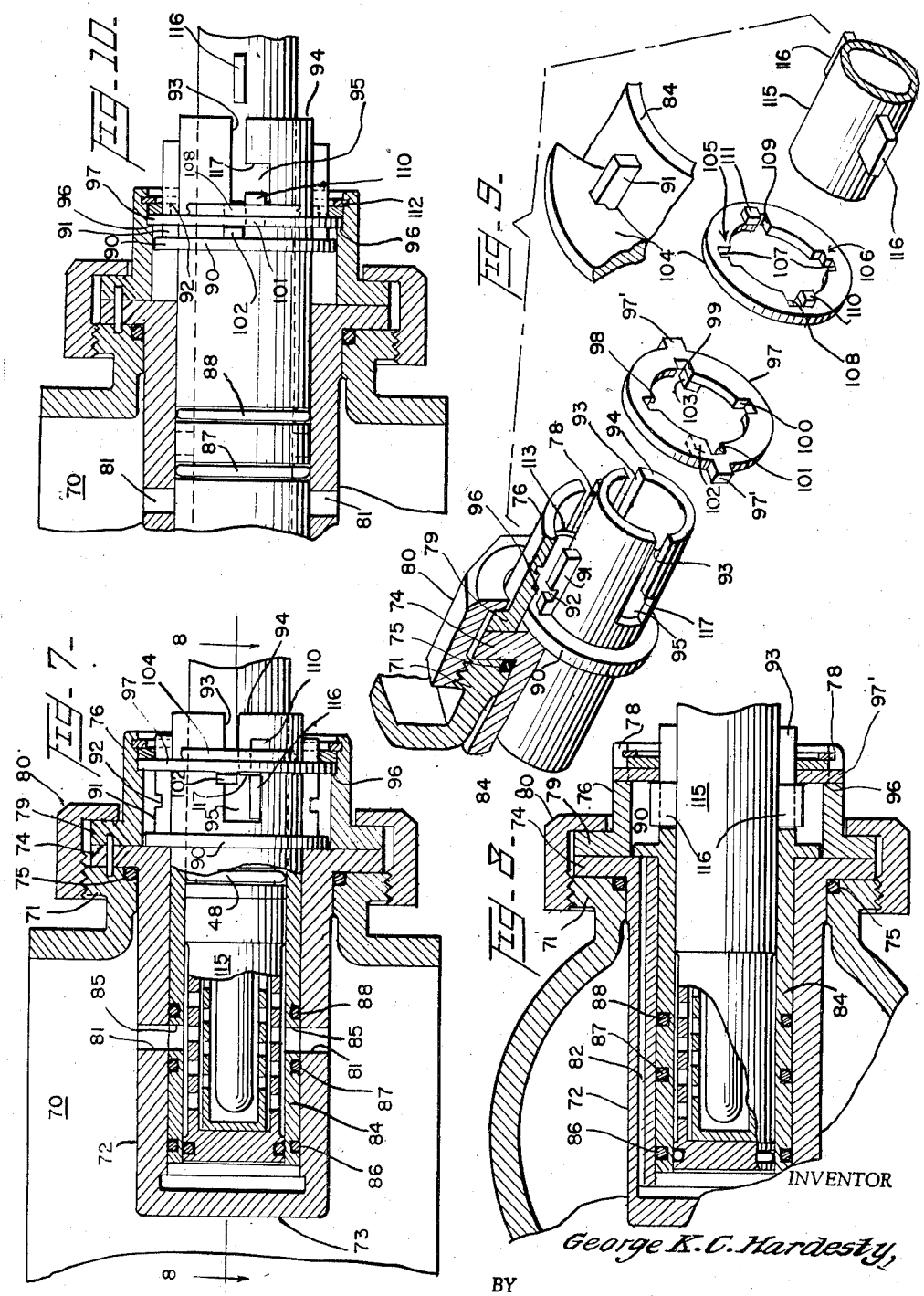

April 22, 1958   G. K. C. HARDESTY   2,832,039
INTEGRAL CONDUCTIVITY CELL AND VALVE
Filed Aug. 7, 1956   4 Sheets-Sheet 4
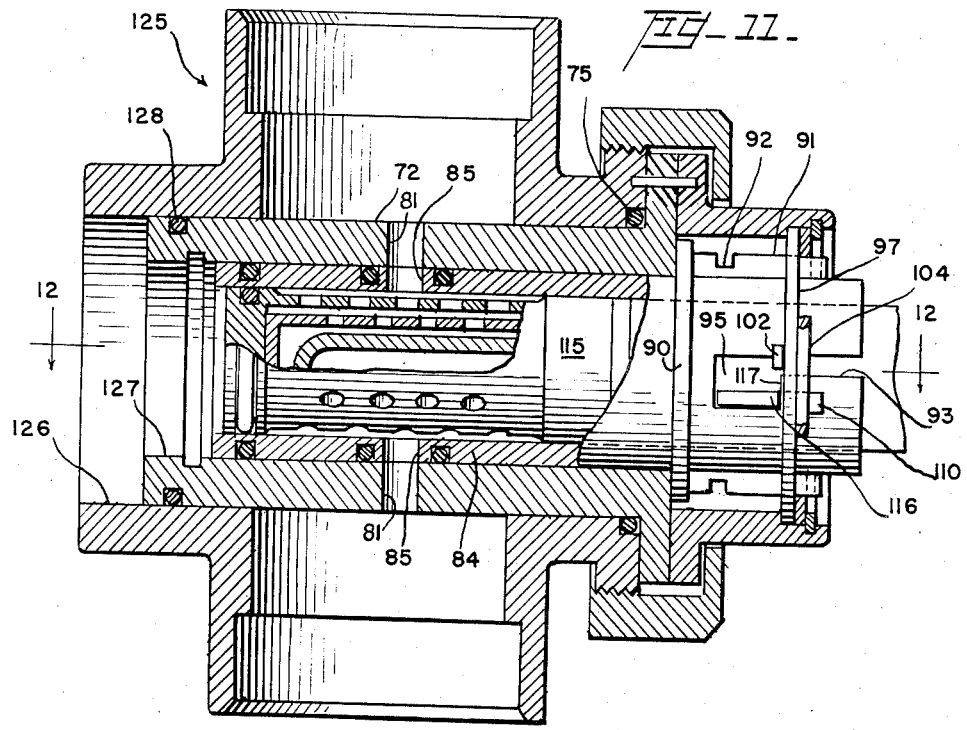
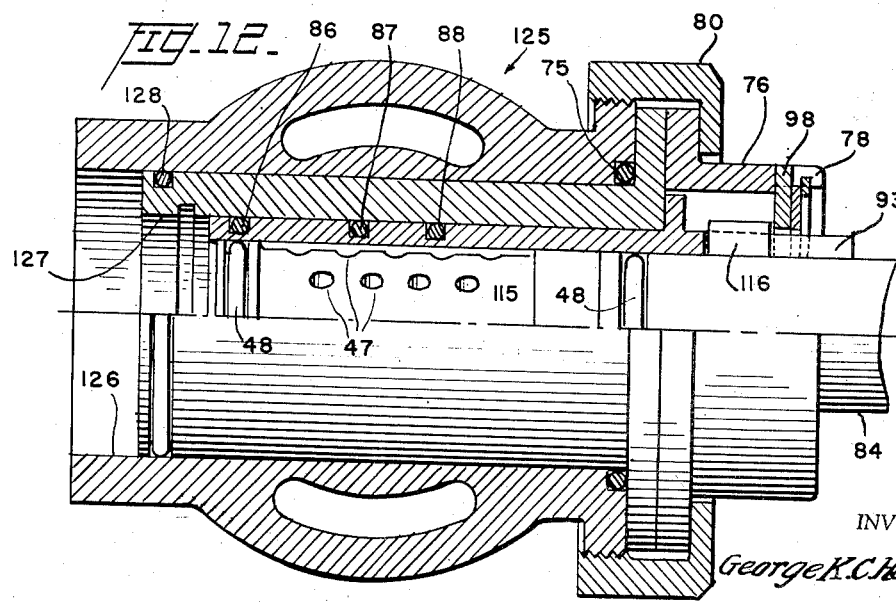
INVENTOR
George K. C. Hardesty
BY
B. L. Zangwill
ATTORNEYS United States Patent Office 2,832,039
Patented Apr. 22, 1958

2,832,039

INTEGRAL CONDUCTIVITY CELL AND VALVE

George K. C. Hardesty, Mayo, Md.

Application August 7, 1956, Serial No. 602,677

8 Claims. (Cl. 324—30)

(Granted under Title 35, U. S. Code (1952), sec. 266)

The invention described herein may be manufactured and used by or for the Government of the United States of America for governmental purposes without the payment of any royalties thereon or therefor.

This invention relates to an integral conductivity cell and valve assembly.

All naval and commercial vessels and industrial water-processing plants process sea water to fit it for use in steam boilers, for drinking, etc. Sea water is a relatively good electrical conductor, but as metallic salts are removed therefrom as it is processed, its conductivity decreases. Hence by measuring the conductivity of water by employing conductivity cells, its purity may be determined. Present day installations employ many conductivity cells in various locations, e. g., pipes, evaporators, feed lines, etc.; the cells monitoring the conductivity of water, and hence its purity.

The removal of the cells for inspection, cleaning and replacement presents a problem in that, during processing, line pressures as high as 150 p. s. i. and temperatures as high as 250° F. are often encountered. In existing installations, for example as disclosed in U. S. Patent 1,670,640, the conductivity cell is designed to be inserted through a separate conventional gate valve, which has been provided with an outboard stuffing box, into the fluid carrying conduit. To remove the cell which is generally a long tubular assembly, it is necessary to pull the cell beyond the gate valve, close the gate valve, and then remove a threaded assembly on the stuffing box to enable removal of the cell through the stuffing box.

The result is an assembly of considerable bulk and weight which requires considerable space in which to remove a cell. Also line pressures, due to hydrostatically unbalanced designs, tend to eject the cells of the prior art even shearing off lugs designed to prevent ejection of the cells. Further unbalanced designs require the exertion of appreciable forces to insert or remove a cell into or from the fluid stream. In addition it is possible to remove the prior art cells without closing the gate valve with the attendant danger of hot fluids under high pressures being ejected.

In accordance with this invention there is provided an integral conductivity cell and valve assembly of compact size and small weight; the whole adapted to be placed in the fluid stream. The asembly further incorporates a hydrostatically balanced construction wherein pipe line pressures do not oppose opening or closing the valve. The large screw and handwheel of the prior art is thereby eliminated and the effort necessary to insert or remove a cell is made negligible, thereby removing a potential hazard. In addition the assembly is provided with interlocks to prevent removal of a cell until the valve is closed.

An object of the invention is the provision of a compact, light, and small valve and conductivity cell assembly.

Another object of the invention is to provide an integral assembly of a conductivity cell and valve adapted to be placed in a fluid stream.

Another object of the invention is to provide an integral assembly of a conductivity cell and valve wherein hydrostatic forces are balanced.

A further object of the invention is the provision of an integral assembly of a conductivity cell and valve wherein removal of the cell therefrom closes the valve simultaneously whereby hazards to personnel are rendered negligible.

Still another object is the provision of a foolproof integral assembly of a conductivity cell and valve adapted to be inserted in a fluid carrying line without the necessity for cutting off the fluid stream.

Other objects and many of the attendant advantages of this invention will be readily appreciated as the same becomes better understood by reference to the following detailed description when considered in connection with the accompanying drawings wherein:

Fig. 1 is substantially a cross sectional view of an integral conductivity cell and valve assembly adapted for insertion in a straight pipe;

Fig. 2 is a partial cross sectional view taken along lines 2—2 of Fig. 1;

Fig. 3 is an exploded view of the interlock system employed in Figs. 1 and 2 in an open port position;

Fig. 4 is a partial cross sectional view of a modified construction adapted for use with a flanged T joint;

Fig. 5 is a view taken along lines 5—5 of Fig. 4;

Fig. 6 is an exploded view of the interlock system of Figs. 4 and 5;

Fig. 7 is a sectional view of a modified construction adapted for use with a flanged T joint showing the ports in open operative positions;

Fig. 8 is a sectional view of Fig. 7 taken substantially along lines 8—8 of Fig. 7;

Fig. 9 is an exploded view of the interlock system of Figs. 7 and 8;

Fig. 10 is a view similar to Fig. 7 showing the ports in a closed position;

Fig. 11 is a sectional view of a modified construction similar to Fig. 7 adapted for use with an insert in a straight pipe; and Fig. 12 is a cross sectional view taken substantially along lines 12—12 of Fig. 11.

Referring now to the drawings, wherein like reference characters designate like or corresponding parts throughout the several views, there is shown in Figs. 1, 2 and 3 a valve body generally designated by 15 having a fluid passageway between oppositely disposed inlet and outlet connections 16 and 17 for connecting the valve body into a fluid carrying line. The valve body 15 is also provided with a conical bore 18, at right angles to the fluid passageway, having end extensions beyond the body 15. The large end 19 of the bore has provided therein oppositely disposed slots 20 and 21 (Figs. 2 and 3) and the small end 22 has formed thereon an exterior shoulder 23. The body is further provided on opposite sides of the flow path with belled portions 24 and 25 to provide fluid bypasses 26 and 27 when the valve is closed whereby fluid flow is never cut off.

Disposed within the conical bore 18 of the valve body 15, in bearing relationship therewith, is a hollow conical valving element 28 having a cylindrical bore. The outer surface of valving element 28 is preferably coated or sheathed in a fluoroplastic to provide a long wearing bearing surface wherein, because of the free seating of mating surfaces, wear is evenly distributed. Valving element 28 is also provided with oppositely disposed inlet and outlet ports 29 and 30, preferably elliptical, adapted, when the valve is open, to be in alignment with elliptical inlet and outlet ports 31 and 32 formed in the bore 18 of the valve body 15.

Valving element 28 is retained within and held in fluid tight bearing relationship against the surface of conical bore 18 by a cup and spring assembly 33 mounted on the shoulder 23. The assembly 33 cooperates with a retainer ring 33' mounted in a groove 34 formed adjacent the end of valving element 28 which protrudes from the small end of conical bore 18; the spring assembly thereby maintaining a pull on valving element 28. The other end of valving element 28 is provided with two oppositely disposed slots 35. Mounted within the large end 19 of the bore 18 is a first interlock ring 36, its inner surface having oppositely disposed undercuts 37 covering substantially 90° quadrants. The interlock ring 36 is further provided with lugs 38 which fit into slots 20 and 21 formed in bore end 19 whereby interlock ring 36 is prevented from rotating. Mounted adjacent the interlock ring 36 is a second interlock ring 39 having the same internal diameter as interlock 36 and having two oppositely disposed slots 40 along its inner diameter of a depth equal to the depth of undercuts 37 in interlock 36. Two oppositely disposed lugs 41 formed on interlock 39 are also adapted to fit in slots 20 and 21 in bore end 19, thereby preventing rotation of interlock ring 39. A locking or snap ring 42 is mounted adjacent interlock ring 39 in a groove 43, in the bore end 19 to maintain the interlock elements in position.

Disposed concentrically within the valving element 28 is a cylindrical conductivity cell generally designated by reference 44, which as understood in the art will measure the electrical resistance to current of the water passing through the valve body 15. Specifically the cell 44, many forms of which are known to the art, comprises an outer cylindrical body 45 having an outer diameter equal to the bore of the valving element 28 except for an annular region of reduced diameter in the vicinity of the electrode areas whereby the fluid entering the ports in the valve body and valving element is equally distributed over the whole surface area of the electrodes. Preferably the cell body 45 is fabricated of bronze metal and platinum sheathed on the inside whereby it serves as the outer electrode of the cell. The cell body 45 is closed at one end 46 and is provided with oppositely disposed inlet and outlet ports 47 or in a preferred embodiment with a plurality of holes bored in its surface. The ports 47 are adapted to align with the inlet and outlet ports in the valve body 15 and valving element 28 when they are disposed in an open position as shown in Fig. 1. Spaced on either side of the ports 47 in the conductivity cell are O-rings 48 adapted to prevent the leakage of fluid into the atmosphere which exists on the the outboard sides of the O-rings. Within the body of the cell is a perforated cylindrical cell baffle 49 of Teflon or Kel-F employed to adjust the cell constant and adapted to slow down fluid flow. Within the cell baffle 49 is an inner electrode 50 which extends to an electrode support wall 51 formed of insulating material such as Teflon or Kel-F. Hydrostatic pressures introduced through the ports 29 act upon the two body areas bounded by the O-rings 48. The body areas are positioned in a manner as to effect two oppositely disposed connected pistons such that when the ports are open the resulting forces existing in the cell are balanced thereby eliminating any tendency to eject the cell 44 or valving element 28 from the valve body 15. Consequently the only forces necessary to overcome when inserting or removing the cell are friction forces. Electrode leads 53 extend from wall 51 through the cell 44 and to a measuring circuit.

The cell body 45 also carries interlock lugs 52 which cooperate with the slots 35 in the valving element 28 and the slots in the interlock rings 36 and 29 to provide a foolproof assembly. With this assembly the cell 44 cannot be removed unless the valve ports 29 and 30 are closed.

Referring to Fig. 3 which shows an exploded view of the interlock mechanism when the ports 29 and 30 are in the open position, it may be seen that the cell 44 cannot be pulled and removed since the second interlock ring slots 40 are not in alignment with the cell lugs 52. In order to remove the cell 44, as by a handle or the like provided at the lug end thereof, a turn in a counterclockwise direction is necessary. In turning the cell, the lugs 52 on the cell, which in the port open position shown project into the valving element's slots 35, cause the valving element 28 to turn thereby closing the ports. The cell lugs 52 are free to turn for 90° within the undercuts 37 on the first interlock ring 36. Hence, the cell, after the turn which lines up its lugs 52 with the slots 40 on the second interlock ring 39 may be removed by a pull. Although flow through ports 31 and 32 is blocked, the flow continues through bypasses 27 and 28 in the valve body 15. Further since the small end of the bore 18 and the bore in the hollow valving element 28 are open to the atmosphere, the removal or insertion of the cell is not impeded by the creation of a vacuum or pressure respectively.

Referring to Figs. 4–6 there is shown a conductivity cell and valve assembly, operatively similar to that described in connection with Figs. 1–3, adapted for use with a fluid line having a flanged T-connection generally designated by 55 having a threaded flange 56. The valve body in this modification is a truncated hollow cone 57 having a wall 58 at its small end. At its large end, the body 57 is provided with an exterior shoulder 59 adapted to abut the edge of flange 56. An O-ring 60 is provided between the end of flange 56 and shoulder 59 whereby, when a union ring 61 threadedly engages the flange 56, the valve body and flanged T pipe connection are made fluid tight. Oppositely disposed holes 62 (Fig. 5) are bored within the walls of the valve body 57 from end to end to provide an atmospheric vent to facilitate insertion or removal of a cell from the assembly. The valving element, conductivity cell assembly, and interlock are substantially identical with the corresponding elements in Fig. 1 and are so referenced. The exception is that a spring 62' mounted between two thrust washers 63 is provided about the large end of valving element 28, the slots 35 therein being lengthened to accommodate the spring. This spring 62' serves the same function as spring assembly 33 in Figs. 1–3.

Referring now to Figs. 7 through 10 there is shown an integral conductivity cell and valving assembly employing a sliding valve and associated interlock system adapted for insertion into a flanged T pipe line connection 70 having a flange 71. The assembly comprises a hollow cylindrical valve body 72 having a closed end 73 and an open end provided with a flange 74. Flanges 71 and 74 are adapted to abut one another and compress an O-ring 75 whereby the connection is rendered fluid tight. An open ended cylindrical valve body cap 76 of greater internal diameter than the valve body 72 and having oppositely disposed slots 78 (Figs. 8 and 9) therein, is provided with a flange 79 adapted to abut flange 74 on the valve body. The pipe connection 70, valve body and cap are aligned by a pin, and securing all three of flanges 71, 74 and 79 together is a union ring 80. The valve body 72 is also provided with oppositely disposed inlet and outlet ports 81 and a vent hole 82 (Fig. 8). A hollow open ended cylindrical valving element 84 adapted to extend concentrically within the valve body and having oppositely disposed inlet and outlet ports 85 is provided about its periphery with three spaced O-rings 86, 87 and 88. Also about its periphery and within the space encompassed by the valve body cap 76, the valving element 84 is provided with a circumferential flange stop 90, and on opposite sides with lugs 91 longitudinally extending from the flange stop 90 toward the open end 94 of the valving element; the lugs 91 being provided with grooves 92 whose function will later be described.

The valving element 84 is further provided with oppositely disposed longitudinal slots 93 extending from the end 94 thereof to enlarged rectangular slotted areas 95 displaced 180° apart. Mounted adjacent the end 94 of valving element 84 against an abutment 96 is a first fixed interlock ring 97 having oppositely disposed lugs 97' adapted to fit within the slots 78 in the valve body cap 76 whereby rotation of the ring 97 is prevented. Fixed interlock ring 97 also has formed about its inner periphery four 90° spaced slots 98, 99, 100 and 101. Slots 98 and 100 are adapted to slide on lug 91 on the valving element 84. Slots 99 and 101 adapted to receive the cell lugs 116 are in alignment with the lugs 97' formed on the outer periphery of the ring 97. A pair of stops 102 and 103 oppositely spaced about the inner periphery are provided on the side of fixed ring 97 facing the ports, one of said stops 103 being flush with the lower surface of slot 99 and the other 102 with the upper surface of slot 101 as seen in Fig. 9.

A rotary interlock ring 104 adapted to be mounted adjacent fixed interlock ring 97 has formed about its inner periphery two oppositely spaced stepped slots 105 and 106, the depth of the deeper or larger steps 107 being equal to the depth of slots 98–101 in the fixed interlock ring 97. The ring 104 also has two oppositely spaced slots 108 and 109 displaced 90° from the stepped slots 105 and 106. Oppositely disposed about the inner periphery are stops 110 and 111 affixed on the side of rotary ring away from the ports, one adjacent the upper surface of slot 109 and the other adjacent the lower surface of slot 108 as seen in Fig. 10.

A lock ring 112 is then placed in a groove 113 in the valve body cap 76 to prevent axial movement of the interlock rings 97 and 104.

A conductivity cell 115 having lugs 116 may be identical with that described in Fig. 1 or with a perforated body as shown to slow down the fluid flow somewhat and equally distribute the fluid over the interior of the cell. The operation of the valve and interlocks to remove a cell 115 is as follows: In the open position of the ports 81 and 85 in Fig. 7 it may be seen that the conductivity cell 115 cannot be pulled out since lugs 116 on the conductivity cell abut not only the shoulder 117 formed by the enlarged slotted area 95 in the valving element 84 but also the interlock ring 97. Hence to remove the cell 115 and close the ports the cell is turned clockwise until the lugs 116 thereon hit the stops 102 and 103 on interlock ring 97. This turn puts the lugs 116 opposite the aligned slots 101 and 108 and 99 and 109 in interlock rings 97 and 104 but does not bring the lug out of the enlarged slotted areas 95. The cell 115 is then pulled thereby pulling the valving element 84, since lugs 116 abut the shoulder 117 of the enlarged slotted areas 95. Valving element 84 therefore moves out until the flange 90 thereon abuts the stops 102 and 103 on the first interlock ring 97. This movement causes seals 86 and 87 to bridge ports 81 thereby closing the ports. This linear movement also brings the grooves 92 in lugs 91 opposite the stepped slots in interlock ring 104 and further brings lugs 116 out of the slots 99 and 101 in interlock ring 97. The cell is then turned further clockwise to remove lugs 116 out of abutment with the shoulders 117 on the enlarged areas and into channel slots 93. In so doing lugs 116 move the interlock 104 with respect to the valving element whereby the intermediate or shallow steps mate with the grooves 92 thereby preventing any further linear movement of the valving element. Hence after this latter turn the cell may be pulled and removed since lugs 116 are now in the channel of slot 93 of valving element 84. With the cell out it will be appreciated from the foregoing that the valving element 84 cannot be pushed in since the groove 92 in lug 91 on the valving element 84 encompasses the inner edge of the intermediate step of stepped slots 105 and 106 on rotary interlock 104. Recapping the only movement of the valve element is a linear sliding movement, the cell being turned in a clockwise direction, pulled, turned again in a clockwise direction and again pulled.

Figs. 11 and 12 show substantially the same valve body 72, valving element 84, cell 115 and associated interlocks as described with reference to Figs. 7–10 coupled to a flange 71 on a modified fluid line connection 125. The connection 125 opposite its flanged side is provided with an extended opening 126 to the atmosphere into which is inserted the valve body 72. As seen in Figs. 11 and 12 the valve body 72 is provided in this modification with an open end 127. An O-ring 128 between the valve body 72 and the opening 126 in the connection provides a fluid seal. The connection is also provided with belled portions and fluid bypasses as described with reference to Fig. 1.

While the invention has been described as an integral assembly of a valve and conductivity cell it is to be understood that the same basic assembly is suitable for temperature-pressure or other type transducers all of which may use a body similar to the body of the conductivity cell described. Further the invention contemplates the use of a dummy cell having the same body configuration and provided with a central bore leading from the port area to a needle valve or the like at the handle end of the cell whereby water samples may be taken at will.

Oviously many modifications and variations of the present invention are possible in the light of the above teachings. It is therefore to be understood that within the scope of the appended claims the invention may be practiced otherwise than as specifically described.

What is claimed is:

1. An integral conductivity cell and valve assembly adapted to be secured into a fluid carrying line comprising a valve body, inlet and outlet ports on said valve body, a valving element, inlet and outlet ports on said valving element, said valving element being concentric with and movable within said valve body over predetermined limits whereby their respective inlet and outlet ports may be opened or closed, a conductivity cell concentrically disposed and movable within said valving element, and interlock means mounted on said valving element and conductivity cell whereby said cell may be removed from said valving element only when said inlet and outlet ports are closed.

2. An assembly as recited in claim 1 wherein said valve body and said valving element include vents to the atmosphere.

3. An integral conductivity cell and valve assembly comprising a hollow valve body adapted to be secured to and extend into the moving stream of a fluid carrying conduit, a hollow valving element within and in bearing relation with said valve body, said valve body and said valving element having normally aligned inlet and outlet ports whereby movement of said valving element closes said ports, a removable conductivity cell body within and in bearing relationship with said valving element, said cell body having a hollow body section with a plurality of openings in the area of said ports, and means mounted about said valving element for preventing removal or insertion of said cell when said ports are open.

4. An integral assembly of a conductivity cell and valve as recited in claim 3 wherein said valve body is provided with inlet and outlet connecting means adapted to secure it to said conduit, and bypass ports between said connecting means whereby fluid flow is never cut off when said first ports are closed.

5. An assembly as recited in claim 3 wherein said valve body and valving element extend through said fluid carrying conduit transverse to fluid flow, the ends of said valve body and valving element extending through said conduit being open to the atmosphere whereby said cell may be inserted or removed with a minimum of force.

6. An integral assembly of a valve and a fluid characteristic measuring transducer adapted to be inserted into a fluid main, comprising a valve body fixedly secured to said main, a longitudinally movable valving element concentric with said valve body, said valve body and said valving element having aligned inlet and outlet ports, spaced sealing means disposed between said valve body and valving element, said sealing means being spaced along the longitudinal axes of the valving element and relative to said inlet and outlet ports, a transducer body concentrically disposed within said valving element for measuring a characteristic of fluid passing through said ports, and interlock means on said valve and transducer body whereby when said transducer body is removed said sealing means bridge said ports to cut off fluid flow.

7. A hydrostatically balanced valve and fluid characteristic measuring transducer comprising a valve body adapted to be fixedly secured to and to extend within a fluid conduit, a movable hollow valving element within said valve body and in fluid tight relationship thereto, aligned inlet and outlet ports in said valving element and valve body adapted to pass fluid into the interior of said valving element when said valve is open, a transducer body within said valving element, fluid seals on said transducer body on either side of said ports, said body between said seals being perforated and spaced from the bore of said valving element, said transducer body between said seals having a hollow chamber in the area of said ports when in operative position, interlock means, and means on said transducer body adapted to cooperate with said interlock means, whereby said transducer body may be removed and detached from said assembly only after said valving element has moved its inlet and outlet ports out of alignment with the inlet and outlet ports in said valve body.

8. An assembly as recited in claim 7 wherein said fluid chararcterstic measuring transducer is a conductivity cell, and wherein said transducer body is one of the electrodes thereof.

References Cited in the file of this patent

UNITED STATES PATENTS

| | | |
|---|---|---|
| 2,234,056 | Moore | Mar. 4, 1941 |
| 2,533,462 | Ingram | Dec. 12, 1950 |
| 2,780,773 | Channon et al. | Feb. 5, 1957 |